United States Patent
Aljaafari et al.

(10) Patent No.: US 11,999,183 B1
(45) Date of Patent: Jun. 4, 2024

(54) FINGER PEN WITH REPLICABLE TIPS

(71) Applicant: KING FAISAL UNIVERSITY, Al-Ahsa (SA)

(72) Inventors: Ahmed Naserallah A. Aljaafari, Al-Ahsa (SA); Abdulrahman Khalid Alsayed, Al-Ahsa (SA); Fahad Ahmed M. Alnaim, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/367,820

(22) Filed: Sep. 13, 2023

(51) Int. Cl.
*B43K 23/012* (2006.01)
*B43K 7/00* (2006.01)
*B43K 19/00* (2006.01)
*G06F 3/0354* (2013.01)

(52) U.S. Cl.
CPC ............. *B43K 23/012* (2013.01); *B43K 7/00* (2013.01); *B43K 19/00* (2013.01); *G06F 3/03545* (2013.01)

(58) Field of Classification Search
CPC .. B43K 23/012; B43K 23/004; B43K 23/008; B43K 7/00; B43K 19/00; G06F 3/03545
USPC .......................................................... 15/443
See application file for complete search history.

(56) References Cited

U.S. PATENT DOCUMENTS

| | | |
|---|---|---|
| 3,947,132 A | 3/1976 | Fox |
| 7,476,043 B1 | 1/2009 | Rivas |
| 10,286,723 B1 | 5/2019 | De Salvo |
| 2010/0065343 A1 | 3/2010 | Liu |
| 2013/0076690 A1 | 3/2013 | Vellanki |
| 2015/0091853 A1 | 4/2015 | Green et al. |
| 2015/0153849 A1 | 6/2015 | Escue |
| 2017/0031468 A1* | 2/2017 | Grossman ............. G06F 3/0383 |
| 2018/0188833 A1* | 7/2018 | Wierenga ............ G06F 3/03545 |
| 2020/0020334 A1* | 1/2020 | Kang ...................... G06F 3/167 |

OTHER PUBLICATIONS

Fidget Pen found at https://a.co/d/3kcSxL5 (Year: 2022).*
Stylus Pen found at https://a.co/d/hA2kO2m (Year: 2022).*
"Finger Stylus", First available online May 26, 2016.

* cited by examiner

*Primary Examiner* — Laura C Guidotti
*Assistant Examiner* — Caleb Andrew Holizna
(74) *Attorney, Agent, or Firm* — Nath, Goldberg & Meyer; Richard C. Litman

(57) ABSTRACT

A writing system includes a silicone finger pen covering including a first end portion and a second end portion. The first end portion includes a magnet and the second end portion includes an opening configured to receive an index finger of an end user. An interchangeable pen tip includes a first section and a second section. The first section is configured to contact a writing surface and the second section includes a metal surface configured to magnetically secure to the magnet. A pen tips casing includes a lid portion and a bottom portion. The bottom portion includes a plurality of slots configured to receive a plurality of interchangeable pen tips. The silicone finger pen covering can be an electronic silicone finger pen covering and a non-electronic silicone finger pen covering. The electronic silicone finger pen covering further includes a battery, a processor, and a button.

4 Claims, 1 Drawing Sheet

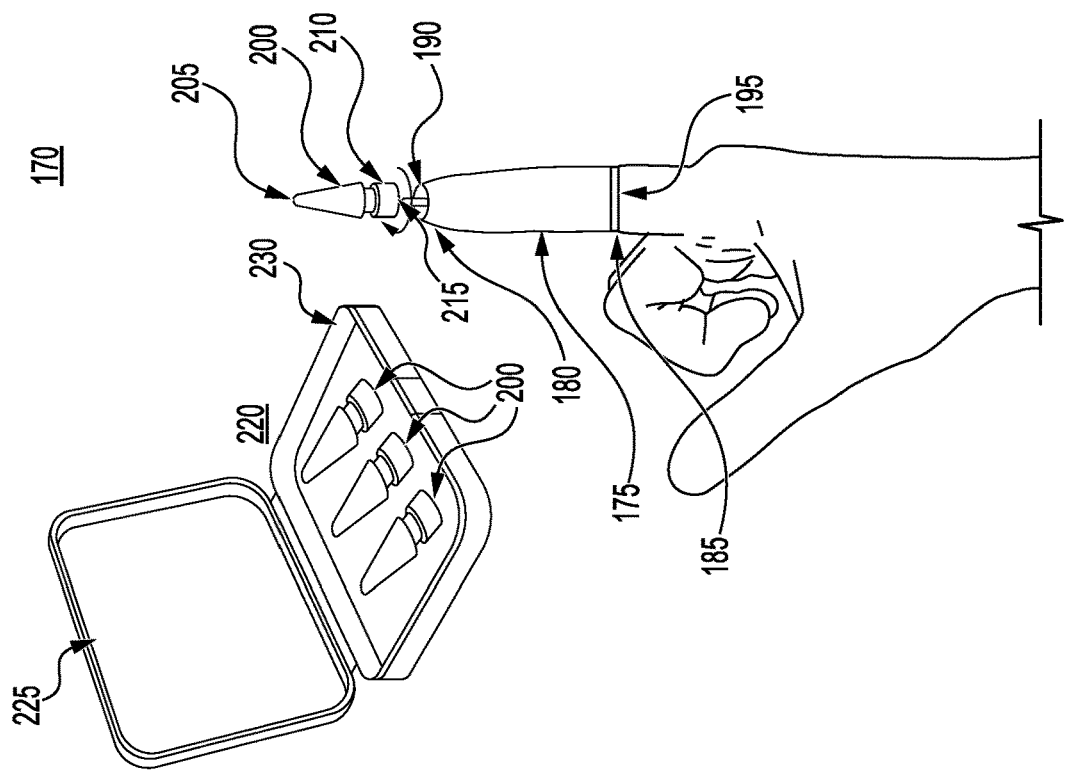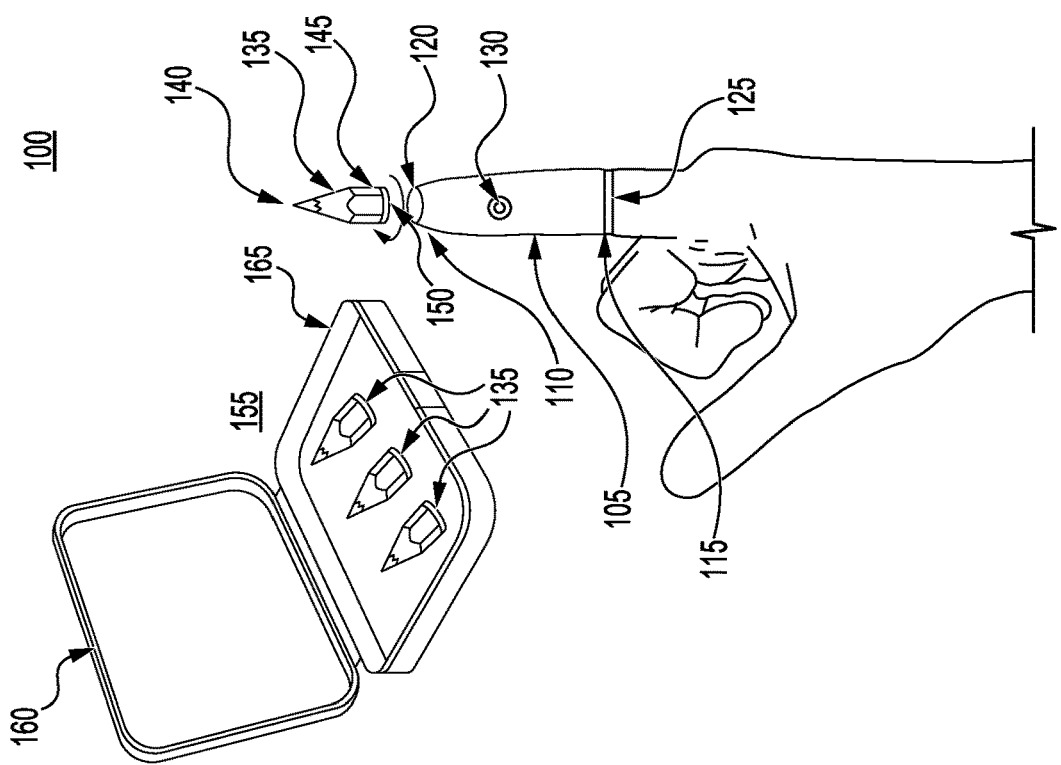

FINGER PEN WITH REPLICABLE TIPS

FIELD AND BACKGROUND

The disclosure of the present application relates to writing systems, and particularly to an electronic writing system and a non-electronic writing system.

DESCRIPTION OF THE PRIOR ART

Writing is an essential skill in our everyday life. Writing is important because it is an essential communication skill, enhances brainstorming, improves mental health, and improves task management.

Writing is a great communication skill because it allows the expression of thoughts and ideas without the pressure of having to do it verbally in front of a person or group of people. Without the time pressure as with verbal communication, more time can be spent to write down the thoughts and ideas in a more effective and concise manner.

When feeling stuck or contemplating a problem, it helps to write down the many thoughts and ideas for brainstorming solutions for solving the problem. This method of expressing, clarifying, and refining the ideas and solutions in written form is an effective method to solving problems.

Writing thoughts or feelings is an important task to perform for dealing with depression, anxiety, or other mental health disorders. Writing is a form of mental health relief by expressing emotion in a written form which may contribute to mental clarity. Positive expressive writing is a form of writing to reduce a state of anxiety that a person may feel.

Rather than remembering a long list of tasks, it is easier to write down the to-dos list. Having the tasks in written form provides clarity of the things to perform, clears the mind of the burden of remembering, and allows for progress and monitoring of the tasks.

There are several writing devices available for writing purposes. One such writing device is a stylus pen which is used for navigating on a touchscreen surface of a smartphone or a tablet. Another writing device is a pen or pencil which is used for writing on paper. All of these writing devices are held by the fingers and thumb in order to perform the basic task of writing.

However, people who have physical disabilities and/or medical conditions may have a problem holding the writing devices, which can result in handwriting difficulties.

Thus, a writing system for solving the aforementioned problems is desired.

SUMMARY

The present subject matter relates to a writing system which, in one non-limiting embodiment, comprises a silicone finger pen covering comprising a first end portion and a second end portion, wherein the first end portion and the second end portion are located at opposite ends of the silicone finger pen covering, the first end portion comprises a magnet, and the second end portion comprises an opening configured to receive an index finger of an end user; an interchangeable pen tip comprising a first section and a second section, wherein the first section and the second section are located at opposite ends of the interchangeable pen tip, the first section is configured to contact a writing surface, and the second section comprises a metal surface configured to magnetically secure to the magnet when the interchangeable pen tip is placed on the first end portion; wherein the interchangeable pen tip comprises a plurality of interchangeable pen tips; and a pen tips casing comprising a lid portion and a bottom portion, wherein the lid portion is hingably attached to the bottom portion and the bottom portion comprises a plurality of slots configured to receive the plurality of interchangeable pen tips.

In an embodiment, the silicone finger pen covering can be an electronic silicone finger pen covering.

In another embodiment, the silicone finger pen covering can be a non-electronic silicone finger pen covering.

In a further embodiment, the silicone finger pen covering further comprises a battery, a processor, and a button; wherein the button is located at a third portion between the first end portion and the second end portion.

In an embodiment, the button is configured to be pressed by a thumb that is adjacent to the index finger of the end user.

In an embodiment, the pressing of the button comprises a long press configured to turn the silicone finger pen covering on, a single press configured to open an application on the writing surface, a double press configured to turn off a screen of the writing surface, and a triple press configured to turn the writing surface to silent mode.

In some embodiments, the writing surface can be a touch screen device having an operating system selected from the group consisting of Apple® touch screen operating system, Microsoft® operating system, and Android® operating system.

In some embodiments, each of the plurality of interchangeable pen tips further comprise a processor configured to connect the plurality of interchangeable pen tips to the writing surface via a Bluetooth® connection.

In some embodiments, the writing surface can be paper.

In some embodiments, the plurality of interchangeable pen tips is selected from the group consisting of a pencil tip and a ballpoint pen tip.

These and other features of the present subject matter will become readily apparent upon further review of the following specification.

BRIEF DESCRIPTION OF DRAWINGS

FIGS. 1A-1B depict an electronic writing system (FIG. 1A) and a non-electronic writing system (FIG. 1B).

Similar reference characters denote corresponding features consistently throughout the attached drawings.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

FIG. 1A depicts, in an embodiment, an electronic writing system (100) which includes an electronic silicone finger pen covering (105) having a first end portion (110) and a second end portion (115), wherein the first end portion (110) and the second end portion (115) are located at opposite ends of the electronic silicone finger pen covering (105). The first end portion (110) includes a magnet (120) and the second end portion (115) includes an opening (125) configured to receive an index finger of an end user. The electronic silicone finger pen covering (105) has a battery (not shown), a processor (not shown), and a button (130). The button (130) is located at a third portion (not shown) between the first end portion (110) and the second end portion (125). The button (130) is configured to be pressed by a thumb that is adjacent to the index finger of the end user. The pressing of the button (130) includes a long press configured to turn the electronic silicone finger pen covering (105) on, followed by a single press configured to open an application on a writing surface (not shown), a double press configured to turn off a screen of the writing surface, and a triple press configured to turning the writing surface to silent mode.

The electronic writing system (100) also includes an interchangeable pen tip (135) having a first section (140) and a second section (145). The first section (140) and the second section (145) are located at opposite ends of the interchangeable pen tip (135). The first section (140) is configured to contact the writing surface. The writing surface is a touch screen device having an operating system which can be any suitable operating system, including without limitation an Apple® touch screen operating system, a Microsoft® operating system, and/or an Android® operating system. The touch screen device can be a smartphone or a tablet. The second section (145) includes a metal surface (150) configured to magnetically secure to the magnet (120) when the interchangeable pen tip (135) is place on the first end portion (110). The interchangeable pen tip (135) includes a plurality of interchangeable pen tips (135). Each of the plurality of interchangeable pen tips (135) further have a processor (not shown) configured to connect the plurality of interchangeable pen tips (135) to the writing surface via a wireless connection, for example a Bluetooth® connection. The electronic writing system (100) further includes a pen tips casing (155) having a lid portion (160) and a bottom portion (165). The lid portion (160) is hingably attached to the bottom portion (165) and the bottom portion (165) has a plurality of slots configured to receive the plurality of interchangeable pen tips (135).

FIG. 1B depicts, in another non-limiting embodiment, a non-electronic writing system (170) which includes a non-electronic silicone finger pen covering (175) having a first end portion (180) and a second end portion (185). The first end portion (180) and the second end portion (185) are located at opposite ends of the non-electronic silicone finger pen covering (175). The first end portion (180) includes a magnet (190) and the second end portion (185) includes an opening (195) configured to receive an index finger of an end user. The non-electronic writing system (170) also includes an interchangeable pen tip (200) having a first section (205) and a second section (210). The first section (205) and the second section (210) are located at opposite ends of the interchangeable pen tip (200).

The first section (205) is configured to contact a writing surface (not shown) which can be paper. The second section (210) includes a metal surface (215) configured to magnetically secure to the magnet (190) when the interchangeable pen tip (200) is placed on the first end portion (180). The interchangeable pen tip (200) includes a plurality of interchangeable pen tips (200). The plurality of interchangeable pen tips (200) can be a pencil tip and a ballpoint pen tip. The non-electronic writing system (170) further includes a pen tips casing (220) having a lid portion (225) and a bottom portion (230). The lid portion (225) is hingably attached to the bottom portion (230) and the bottom portion (230) comprises a plurality of slots configured to receive the plurality of interchangeable pen tips (200).

It is to be understood that the present processes, compositions, and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A writing system, comprising:
    a silicone finger pen covering comprising a first end portion and a second end portion, wherein the first end portion and the second end portion are located at opposite ends of the silicone finger pen covering, the first end portion comprises a magnet, and the second end portion comprises an opening configured to receive an index finger of an end user;
    an interchangeable pen tip comprising a first section and a second section, wherein the first section and the second section are located at opposite ends of the interchangeable pen tip, the first section is configured to contact a writing surface, and the second section comprises a metal surface configured to magnetically secure to the magnet when the interchangeable pen tip is placed on the first end portion; wherein the interchangeable pen tip comprises a plurality of interchangeable pen tips; and
    a pen tips casing comprising a lid portion and a bottom portion, wherein the lid portion is hingably attached to the bottom portion and the bottom portion comprises a plurality of slots configured to receive the plurality of interchangeable pen tips,
    wherein the silicone finger pen covering is an electronic silicone finger pen covering,
    wherein the silicone finger pen covering further comprises a battery, a first processor, and a button,
    wherein the button is located at a third portion between the first end portion and the second end portion, and
    wherein each of the plurality of interchangeable pen tips further comprise a second processor configured to connect the plurality of interchangeable pen tips to the writing surface via a wireless connection.

2. The writing system of claim 1, wherein the button is configured to be pressed by a thumb that is adjacent to the index finger of the end user.

3. The writing system of claim 2, wherein the pressing of the button comprises a long press configured to turn the silicone finger pen covering on, a single press configured to open an application on the writing surface, a double press configured to turn off a screen of the writing surface, and a triple press configured to turning the writing surface to silent mode.

4. The writing system of claim 1, wherein the writing surface is a touch screen device having an operating system.

* * * * *